(12) United States Patent
Yasui

(10) Patent No.: US 6,226,836 B1
(45) Date of Patent: May 8, 2001

(54) GRIP AND METHOD OF MANUFACTURING THE SAME

(75) Inventor: Toshihiko Yasui, Tondabayashi (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 09/365,204

(22) Filed: Aug. 2, 1999

(30) Foreign Application Priority Data

Aug. 5, 1998 (JP) .................................................. 10-221350

(51) Int. Cl.⁷ .................................................. A01K 87/02
(52) U.S. Cl. .......................... 16/421; 16/110.1; 473/300; 473/549
(58) Field of Search .................. 16/421, 110.1, 16/DIG. 12; 473/300, 549

(56) References Cited

U.S. PATENT DOCUMENTS

| | | | |
|---|---|---|---|
| D. 383,821 | * | 9/1997 | Wood .................................... 473/300 |
| 3,975,855 | * | 8/1976 | McKeown ............................... 43/23 |
| 4,373,718 | * | 2/1983 | Schmidt ................................. 43/23 |
| 4,467,548 | * | 8/1984 | Tabor .................................... 43/23 |
| 5,599,242 | * | 2/1997 | Solviche et al. ....................... 473/300 |

* cited by examiner

Primary Examiner—Anthony Knight
Assistant Examiner—Enoch E Peavey
(74) Attorney, Agent, or Firm—Shinjyu Intellectual Property Firm

(57) ABSTRACT

A cork grip includes a main part (21) that is formed of cork pieces each having a predetermined cylindrical shape that are punched out of a cork sheet formed of cork material stripped from a cork tree and pressed into the shape of a board. The cork sheet is punched into the cylindrical shapes in such a manner that pithy tissues (6a) of the cork intersect with the axial direction of the main part (21). The pithy tissues (6a) of the main part 21 are filled with a filling agent that includes a mixture of binder and cork powder.

6 Claims, 5 Drawing Sheets

GRIP AND METHOD OF MANUFACTURING THE SAME

BACKGROUND OF THE INVENTION

A. Field of the Invention

The present invention relates to a cork grip and method of manufacturing the grip, the grip being for use on a handle or grip portion of an implement, and in particular for use on the handle or grip portion of a sports related implement such as a fishing rod or a golf club.

B. Description of the Background Art

Cork is a protective layer of cells that grows near the outer surface of wood producing plants. Cork is a light and highly elastic material, and exhibits excellent resistance against heat, electricity, sound, water and the like. In recent years use of cork materials for grip portions of golf clubs, tennis rackets, and other sports related implements has increased. Such cork grips are typically formed by stripping a tree of bark and pressing the bark into the shape of a board. Pieces of the cork are then punched or cut out of the processed cork material such that each piece has a predetermined cylindrical shape. The pieces are then linked or adhered to one another to form the shape of the grip.

A cork grip manufactured in this manner typically contains a number of naturally occurring holes or gaps as a result of, for instance, what is referred to as "pithy tissue". The holes or gaps may filled with a filling agent that includes cork powder and a binder mixed together to improve durability and the design of the cork grip.

The conventional cork grip described above, is formed from cork pieces that are obtained by punching out or cutting the cork sheet described above. However, such cork material is taken from a tree in a circumferential direction with respect to the outer diameter of the cork tree. The pieces which subsequently form the grip are typically formed such that gaps, holes and other inconsistencies such as "pithy tissue" of the cork material are oriented in a longitudinal direction of a grip piece. For instance, a conventional grip, as shown in FIG. 5, may include "pithy tissue" that appears as elongated imperfection that extend in the longitudinal direction on a peripheral surface of the grip.

The filling agent described above can easily fall off the grip and consequently the appearance and feel of the grip may not desirable. Further, since the binder contained in the filling agent hardens to a consistency that differs from the consistency of the cork in some cases, those portions of the grip which include the filling agent do not always feel smooth.

SUMMARY OF THE INVENTION

An object of the present invention is to provide a cork grip which does not break easily and has a desirable appearance.

Another object of the invention is to provide a simple method of manufacturing such a cork grip.

In accordance with one aspect of the present invention, a grip for a hand held implement, such as a fishing rod and a golf club, includes a main part of cork material that has a cylindrical shape. The cork material has naturally occurring pithy tissues and the main part is formed such that the pithy tissues are oriented in a direction that intersects with an axial direction of the cylindrical shape of the main part. A filling agent is inserted in the pithy tissues.

Preferably, the pithy tissues intersect with the axial direction of the cylindrical shape of the main part such that the pithy tissues are generally perpendicular to the axial direction.

Preferably, the main part includes a plurality of cylindrical pieces of cork material that fixed together to form the cylindrical shape of the main part.

In accordance with another aspect of the present invention, there is a method of manufacturing a grip for a hand held implement such as a fishing rod or a golf club, the method includes the steps of:

punching out cylindrical cork pieces from a cork material such that naturally occurring pithy tissues in the cork material intersect an axial direction of each cork piece; and applying a filling agent to the pithy tissues thereby filling in voids associated with the pithy tissues.

Preferably, the method further includes the step of removing cork from a cork tree to form a cork sheet that has a board-like shape which constitutes the cork material where the cylindrical cork pieces are punched from the cork sheet.

Preferably, the method includes the step of processing the cork sheet to provide the cork sheet with generally uniform consistency before the punching step.

Preferably, the method further includes the step of adhering a plurality of the cylindrical cork pieces to each other in succession in the axial direction to thereby form a main part of the grip before the applying step.

In the above aspects of the present invention, the pithy tissues are oriented in a direction that intersects the axial direction of the main part of the grip, and therefore, the pithy tissues appear as fine circular shapes on a surface of the main part of the grip. That is, since the length of pithy tissues do not appear on the surface of the main part, the filling agent which fills in the pithy tissues does not easily fall off and the durability of the grip is consequently improved. Further, since only small amounts of the filling agent are used to fill in the gaps or openings that correspond to the pithy tissues, production is easy and manufacturing costs are reduced. Still further, since the amount of the filling agent to be injected is small, deterioration in the touch and feel of the grip typically caused by the binder in the filling agent is suppressed.

These and other objects, features, aspects and advantages of the present invention will become more fully apparent from the following detailed description of the present invention when taken in conjunction with the accompanying drawings where like reference numerals denote corresponding parts throughout the accompanying drawings.

DESCRIPTION OF THE PREFERRED EMBODIMENTS

One preferred embodiment of the present invention is described with reference to FIGS. 1, 2, 3, 4A and 4B.

Overall Structure

Figure 1:
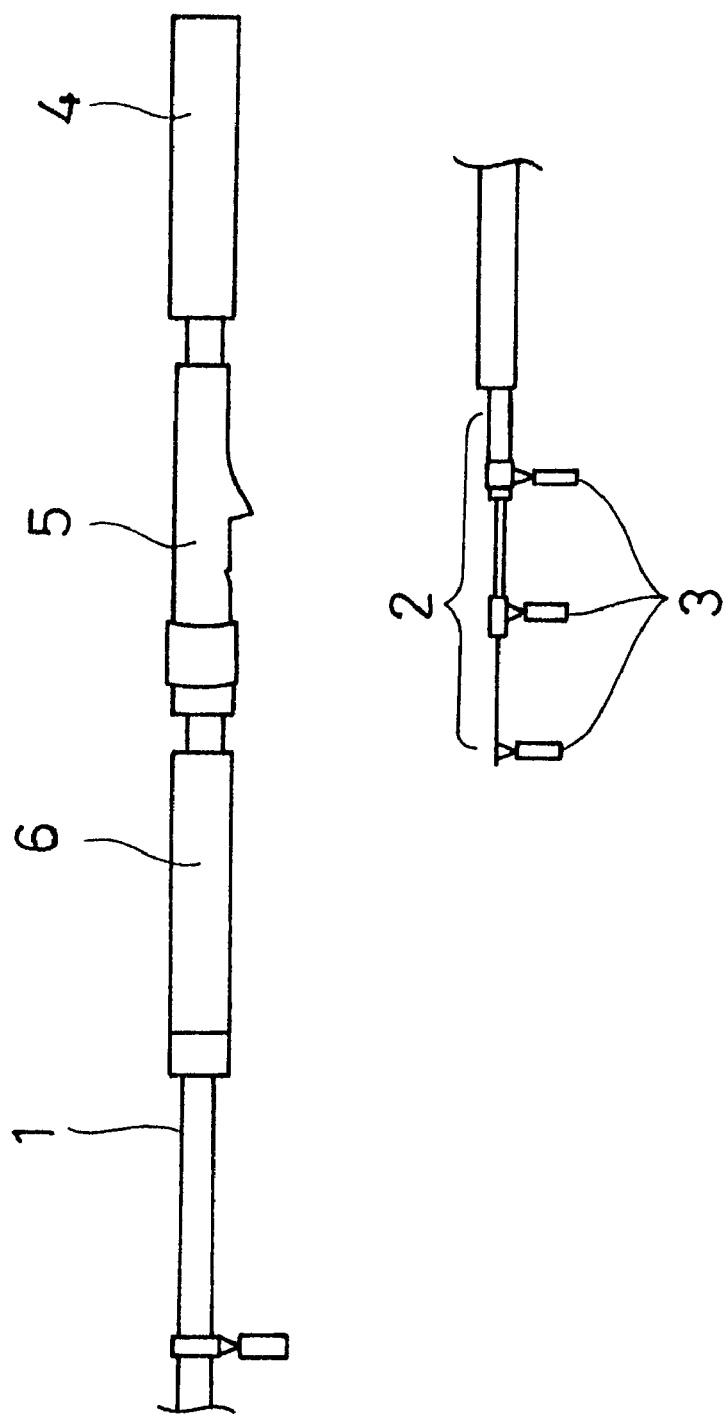
FIG. 1 is a fragmentary side view of a fishing rod having several grip portions in accordance with a first preferred embodiment of the present invention.

A fishing rod according to a first preferred embodiment of the present invention, as shown in FIG. 1, includes an inner rod member 2 which is formed of a plurality of rod members that can be collapsed in a telescoping manner into an outer rod member 1 which is linked to the inner rod member 2 such that the inner rod member 2 is inserted and housed within the outer rod member 1.

The outer rod member 1 and the inner rod member 2 are tapered cylindrical members that are formed by winding a prepreg, i.e., a carbon fiber or a glass fiber impregnated with a reinforcing resin, around a mandrel and bonding the prepreg and resin together. Further, a plurality of line guides 3 through which a fishing line may pass are fixed at predetermined intervals to portions of the outer rod member 1 and inner rod members 2.

The outer rod member 1 includes a butt grip 4 that is disposed at a butt end of the outer rod member 1, a reel seat 5 that is located adjacent to the butt grip 4 in order to receive and support a reel (not shown), and a front grip 6 that is located adjacent to the reel seat 5, as shown in FIG. 1. The fishing line (not shown) extends from the reel at the reel seat 5 through the line guides 3 toward the tip end of the inner rod members 2.

Figure 2:
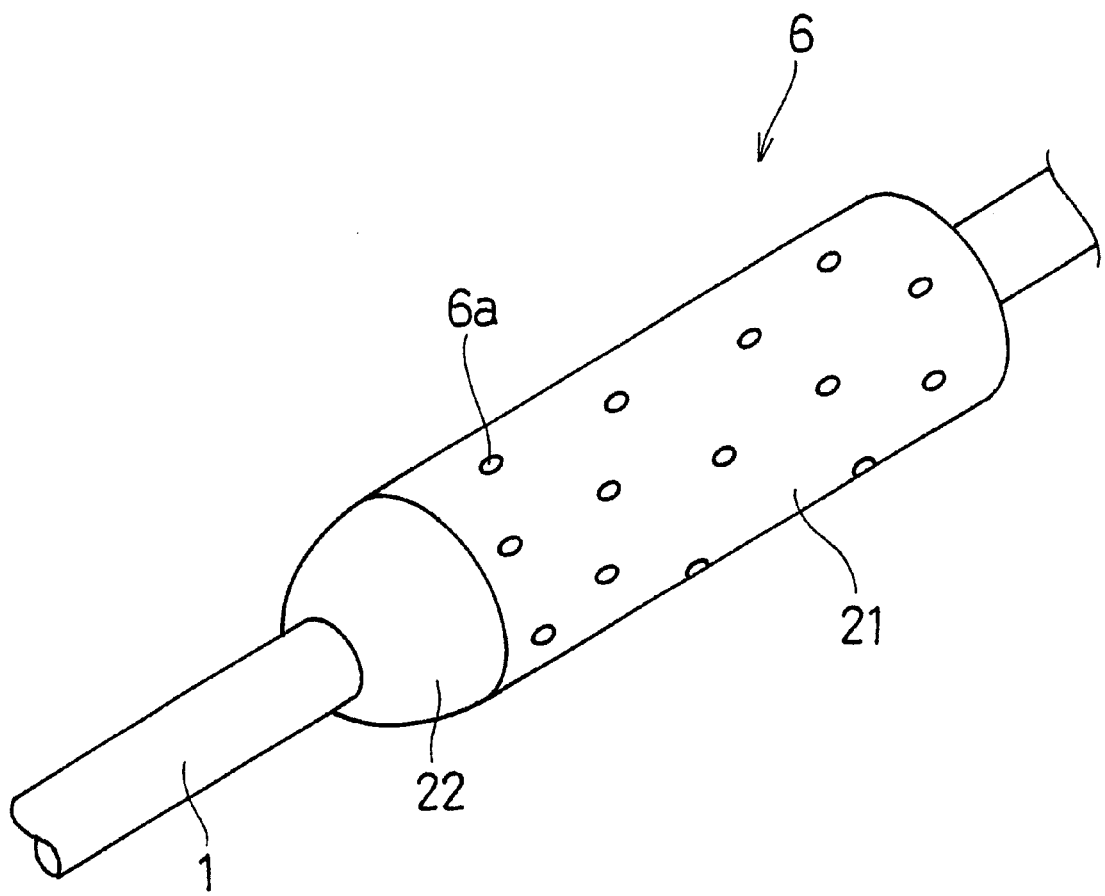
FIG. 2 is an enlarged view of a front grip of the fishing rod depicted in FIG. 1.

As shown in FIG. 2, the front grip 6 is a cylindrical member made of cork material that is fitted and fixed by an adhesive or the like to the outer rod member 1 at a predetermined location. The front grip 6 includes a column-like main part 21 of cork into which the outer rod member 1 is inserted, and a cap part 22 that is also made of cork and is fitted to a tip side end of the main part 21.

The main part 21 (described in further detail below), is formed of cork pieces that are each punched out from a cork sheet that is obtained by peeling a bark off a cork tree and pressing the peeled bark into the shape of a board. The cork pieces are then cut in a predetermined cylindrical shape from the cork board.

Figure 3:
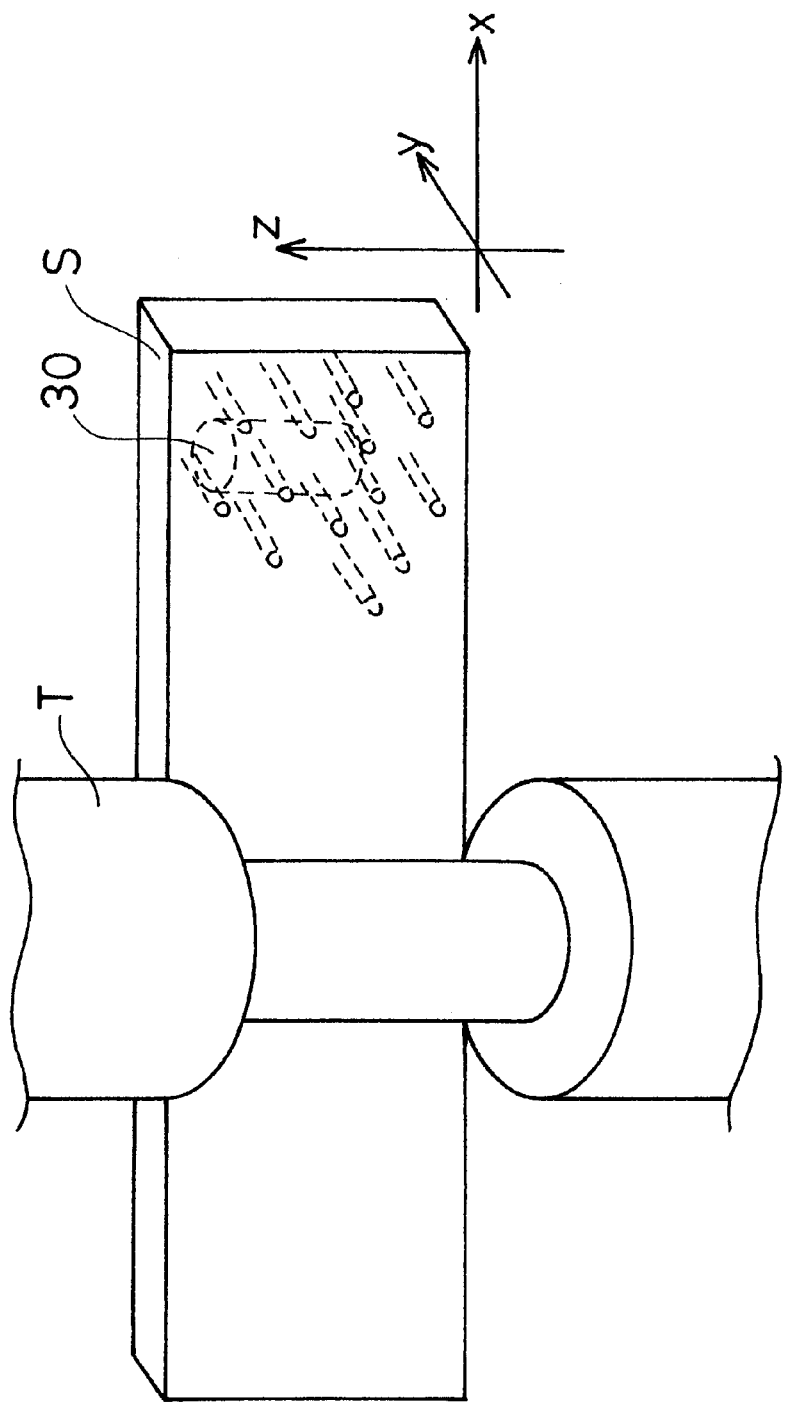
FIG. 3 is a fragmentary perspective view of a tree or other cork producing plant showing the orientation of cork material as it is removed from the tree or plant, and further indicating the orientation of portions of the cork material which subsequently form a front grip of the fishing rod.

The cork pieces are cut from the cork board in a very specific manner to form cylindrical shaped pieces such that the natural pithy tissues 6a of the cork extend in a direction perpendicular to the axial length of each cylindrically shaped piece, as shown in FIG. 3. Therefore, pithy tissues 6a of the cork do not extend along an axial direction of the main part 21. The pithy tissues 6a of the main part 21 are filled with a filling agent (not shown) that is made up of, for example, a mixture of a binder and cork powder.

Returning to FIG. 2, the cap part 22 has a tapering cylindrical shape which has a progressively smaller diameter toward a tip side thereof. Specifically, one end of the cap part 22 contact the main part 21 of the grip and has the same outer diameter as the main part 21. However, as the cap part 22 extends away from the main part 21, the outer diameter of the cap part 22 diminishes to form a cap shape, as depicted in FIG. 2. The cap part 22 is preferably made of a synthetic resin but could alternatively be made of metal or plastic. An opening of the cap part 22 on the butt side thereof contacts and is fixed to the tip side of the main part 21.

Like the front grip 6, the butt grip 4 shown in FIG. 1 is a capped cylindrical member which is formed from a cylindrically shaped piece of cork that is punched out of a cork sheet in a manner generally the same as the main part 21 of the front grip 6. As with the front grip 6, the butt grip 4 includes pithy tissues and as with the front grip 6, the butt grip 4 is cut or punched from the cork sheet such that the pithy tissues extend in a direction perpendicular or close to perpendicular to the axial length of the butt grip 4. The pithy tissues of the butt grip 4 are also filled with a predetermined filling agent that is made of, for instance, a binder material such as an adhesive, mixed with cork powder.

Method of Manufacturing Grips

Now, a method of manufacturing the front grip 6 will be described with reference to FIGS. 3, 4A and 4B.

First, as shown in FIG. 3, a layer of bark or cork material is removed or peeled off of a cork tree T. The cork material is then pressed, stretched and/or shaped into the shape of a board, thereby forming a cork sheet S. It should be understood that the removal of the cork may include any of a variety of means such as peeling, cutting, scraping or otherwise pulling the outer cork layer off the outer portion of the tree T. Further, depending upon the initial quality of the cork material, the cork material is then shaped to form the cork sheet S. The shaping process may include, as needed, any one, combination of two or more or all of the following procedures. The shaping process may include: pressing the cork to provide uniform thickness; shaving the surfaces of the cork material to provide uniform thickness; cutting off imperfections to obtain a more uniform consistency of the cork material; stretching the cork material to provide a more consistent density; and/or treating the cork material to soften/harden or otherwise work the cork to provide a more uniform consistency of the cork material. It should be understood that perfect specimens of cork material may need little or no shaping in order to form the cork sheet S and that the above shaping processes are merely possible examples of the type of processing that might be necessary in order to produce the cork sheets S.

The cork sheet S naturally includes pithy tissues which are shown in FIG. 3 in dotted lines as cylindrical voids or openings. It should be appreciated that in nature there is rarely such uniformity in such pithy tissues and that the dotted lines in FIG. 3 are merely meant to represent the imperfectly shaped pithy tissues which may occur in natural cork. The pithy tissues make the cork porous. As shown in FIG. 3, such pithy tissues typically extend in a radially outward direction with respect to the center of the cork tree T. Therefore, once the cork sheet S is removed from the cork tree T and is laid flat to form the cork sheet S, as in FIG. 3, the pithy tissues extends in a y-direction with respect to the planar orientation of the cork sheet S.

The cork pieces 30 are cut or punched out from the cork sheet S in order to have a cylindrical shape and are specifically cut or punched out from the cork sheet S such that the pithy tissues extend perpendicular or close to perpendicular to the axial length of the cylindrically shaped cork pieces 30. Specifically, the cork pieces 30, as shown in FIG. 3, have an axial length aligned with the Z-axis in the preferred embodiment of the present invention, while the pithy tissues of the cork sheet S preferably are aligned or are closely aligned with the y-axis.

Figure 4A:
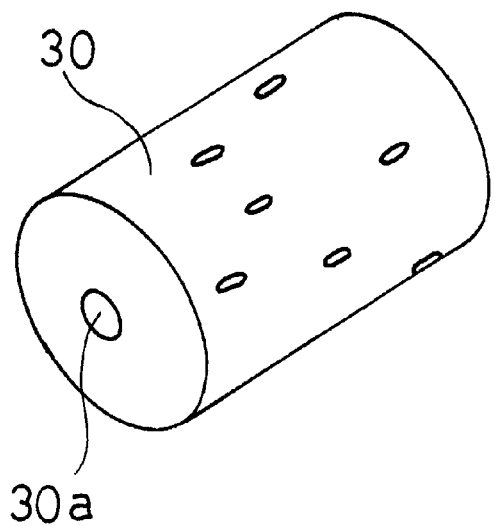
FIGS. 4A and 4B are fragmentary perspective views showing steps for manufacturing the front grip.
Figure 4B:
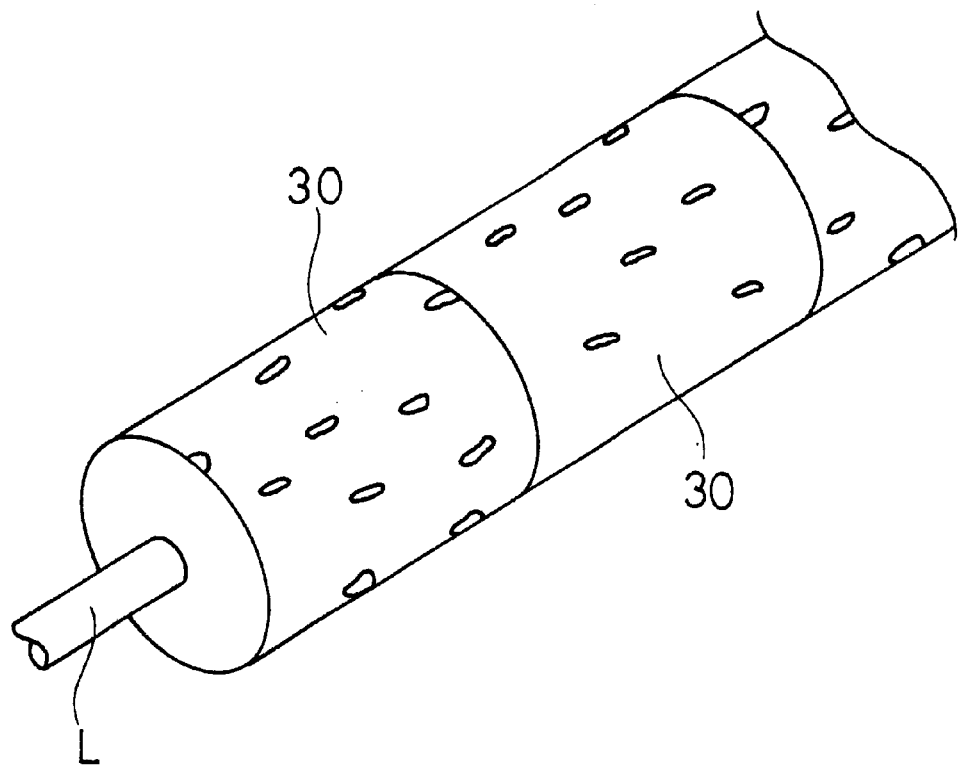
Figure 5:
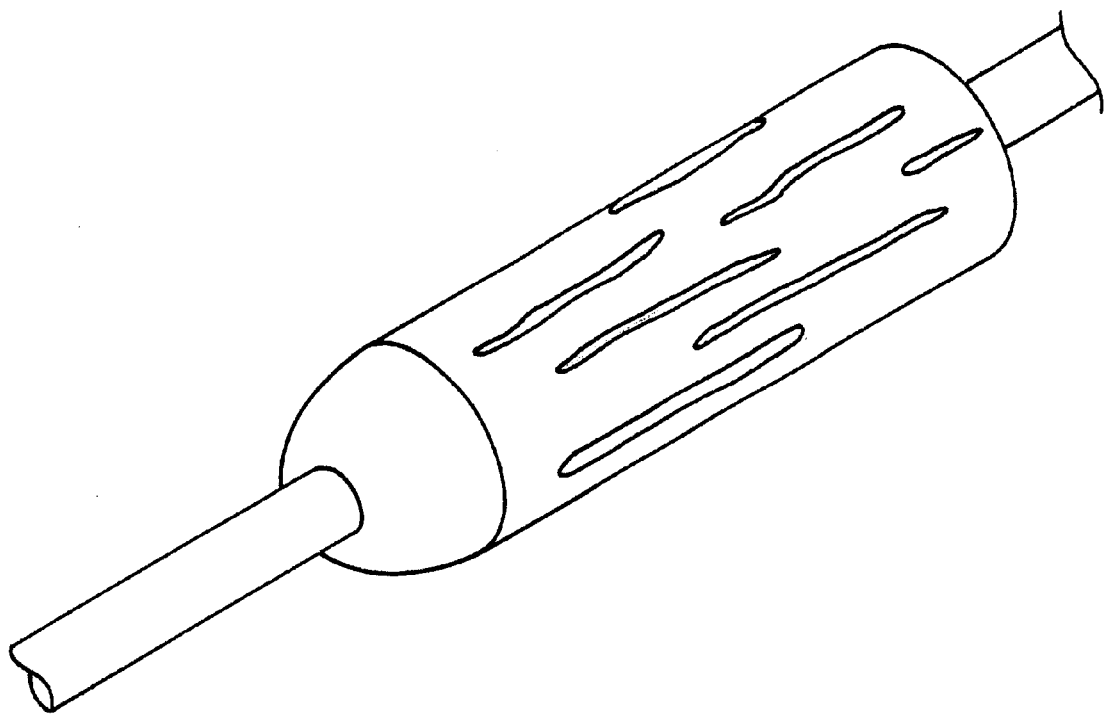
FIG. 5 a view of a conventional grip.

Thereafter, as shown in FIG. 4A, a through hole 30a is bored through each cork piece 30 generally along an axial center of the cork piece 30, and a shaft rod L is passed through the through holes 30a of several cork pieces 30 that contact each other in the axial direction as shown in FIG. 4B. The cork pieces 30 are thereafter bonded by an adhesive or the like to each other. In this condition, the cork pieces 30 are still different from each other in size, shape, etc., and therefore, outer peripheral surfaces of the cork pieces 30 are shaped by chipped off or otherwise appropriately surface-processing the surfaces thereof to subsequently form an even, uniform surface on the grip. At this stage, the filling agent mixing the cork powder and the binder is injected into pithy tissues which are open to the outer surfaces of the cork pieces 30, and as a result, the cork pieces 30 are accordingly strengthened. In addition, the surfaces may be polished or otherwise appropriately processed to produce a smooth, uniform outer surface on the grip.

It should be understood that although several cork pieces 30 are used to form the grip depicted in FIG. 4B, the grip may alternatively be formed of a single cork piece 30, depending on the size of the grip and/or the size of the cork sheets S used in the production of the cork pieces 30.

The shaft rod L is thereafter pulled out and the adhered cork pieces 30 are cut into a predetermined length, whereby the main part 21 is manufactured. The main part 21 is then fitted on to the outer surface of the outer rod member 1 at a predetermined position and fixed by an adhesive or the like. The cap part 22 is then fit into the main part 21 on the tip side, thereby manufacturing the front grip 6.

The butt grip 4 is manufactured in a similar manner to that of the front grip 6 and is thereafter fitted to the outer rod member 1.

In the fishing rod having a structure as described above, the pithy tissues 6a are oriented in the direction which intersects with the axial direction of the main part 21 and appear as fine circles on the surface of the main part 21. In short, since a large pithy tissue 6a does not appear on the surface of the main part 21, the filling agent which is filled in the pithy tissues 6a does not easily fall off and the durability is accordingly improved. Further, the design is also better. Moreover, since a small amount of the filling agent may be filled in the pithy tissues, production is easy and a manufacturing cost is reduced.

Still further, since the amount of the filling agent use is reduced, deterioration in the touch and feel of each grip associated with the use of the binder contained in the filling agent is also reduced since less filling agent is used.

Other Preferred Embodiments (a) A grip according to the present invention is not limited to a grip of a fishing rod, but rather may be applied to a golf club, a tennis racket, a walking stick, or other such implements which require a grip.

(b) Other than cork powder, various types of materials may be mixed to the filling agent.

As described in the foregoing, the present invention provides a cork grip which does not break easily and has an excellent, appealing appearance.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A grip for fishing rods, golf clubs, and like hand-held implements, the grip comprising:

a cylindrical cork material main part formed such that pithy tissues naturally occurring in the cork material are oriented substantially orthogonal to the cylindrically longitudinal axis of said main part; and a filling agent filling the pithy tissues.

2. The grip as set forth in claim 1, wherein said main part comprises a plurality of cylindrical sections.

3. A method of manufacturing a grip for fishing rods, golf clubs, and like hand-held implements, the method comprising the steps of:

punching out cylindrical cork pieces from a cork material such that naturally occurring pithy tissues in the cork material intersect the cylindrically longitudinal axis of each cork piece; and applying a filling agent to the pithy tissues thereby filling in voids associated with the pithy tissues.

4. The method as set forth in claim 3, further comprising the step of:

removing cork from a cork tree to form a cork sheet that has a board-like shape which constitutes the cork material, the cylindrical cork pieces being punched from the cork sheet.

5. The method as set forth in claim 4, further comprising the step of:

before said punching step:
      processing the cork sheet to provide the cork sheet with generally uniform consistency.

6. The method as set forth in claim 5, further comprising the step of:

before said applying step:
      adhering a plurality of the cylindrical cork pieces to each other in succession in the axial direction to thereby form a main part of the grip.

* * * * *